United States Patent Office 2,765,704
Patented Oct. 9, 1956

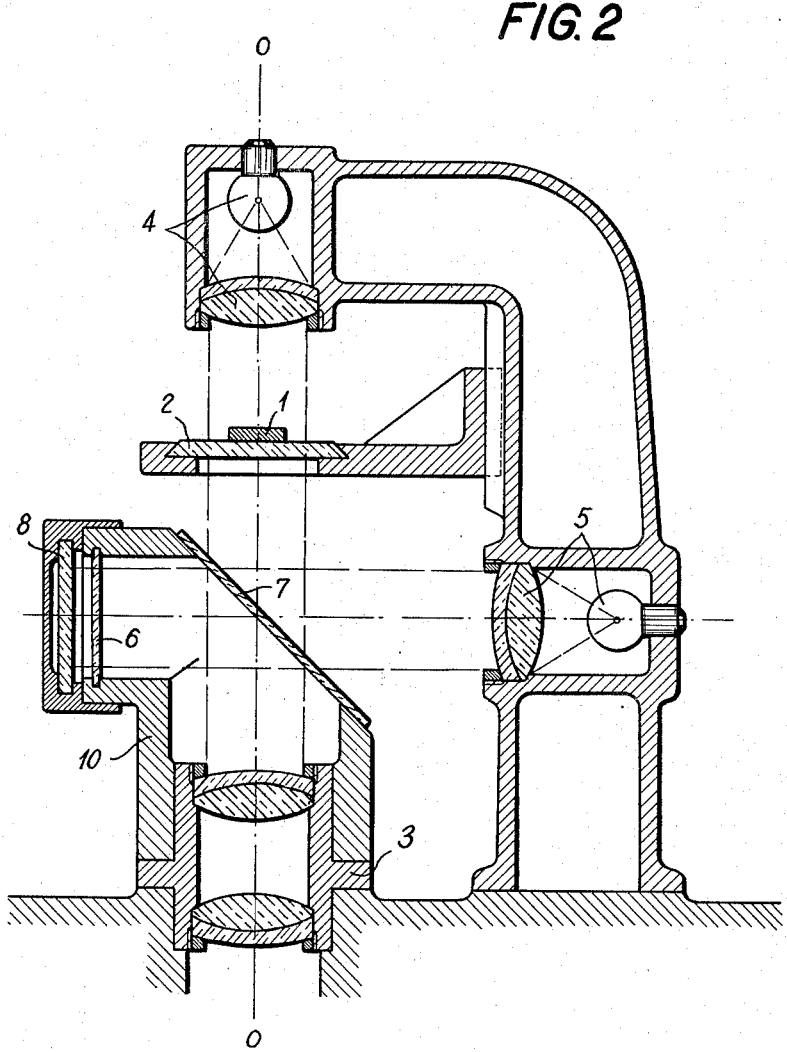

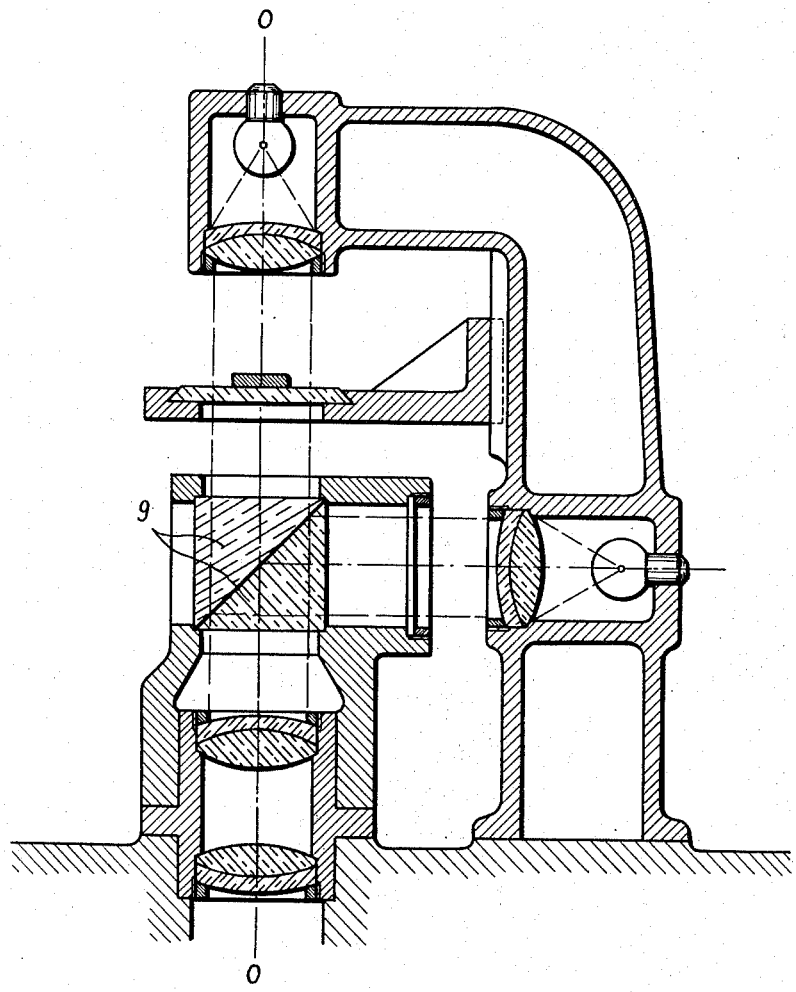

2,765,704

ARRANGEMENT FOR PROJECTING IN SUPERPOSITION THE IMAGES OF A WORK PIECE AND OF A REFERENCE DRAWING THROUGH AN OUTLINE PROJECTOR

André Mottu, Geneva, Switzerland, assignor to Societe Genevoise d'Instruments de Physique, Geneva, Switzerland, a Swiss firm Application July 7, 1953, Serial No. 366,541

Claims priority, application Switzerland July 17, 1952

9 Claims. (Cl. 88—24)

The present invention has for its object an episcopic and possibly diascopic arrangement for simultaneously projecting in superposed relationship on the screen of an outline projector, the images of a section of the workpiece to be checked and of a reference drawing at the scale 1/1 with reference to the said workpiece.

The checking of such workpieces is generally provided by executing a drawing of the workpiece on glass or transparent paper to a scale corresponding to the enlargement provided by the projector, and said reference drawing is positioned over the screen so that its conformity with the projected outline image of the workpiece may be checked.

The fact that the drawings are generally large-sized, leads to certain drawbacks which it has been attempted to remove by resorting to a reference drawing on the actual scale of the workpiece and by projecting it with the same ratio of enlargement as the outline of the workpiece onto the screen where its image is superposed over that of said workpiece.

Projectors have already been proposed which operate in accordance with this latter method, such projectors including an auxiliary objective, the enlargement of which is 1 X with a view to forming a first image of the reference drawing in the object plane of the main objective, said first image being then projected onto the screen by the said main objective. This arrangement shows, however, various drawbacks, in particular because the optic aberrations of an objective the enlargement ratio of which is 1 X, are difficult to correct, and the deformations of the first image appearing consequently in the object plane are projected with the enlargement of the main objective onto the screen and prevent perfect accuracy of the checking. Furthermore, the cost of such optic arrangements is comparatively high. The present invention has for its object to remove these drawbacks. It has for its main feature the fact that the images of the drawing and of the workpiece are formed by the same single objective.

This cuts out the auxiliary objective and therewith an important source of errors and also the optic system of the outline projector becomes simpler and less expensive.

Accompanying drawing illustrations by way of example a preferred embodiment of an outline projector incorporating the conventional diascopic and episcopic illuminating means and operating in accordance with the invention. In said drawings:

Fig. 2 is a diagrammatic cross-section of the same arrangement operating through episcopic illumination;

Fig. 3 illustrates the same embodiment incorporating a modification in its structure.

Figure 1:
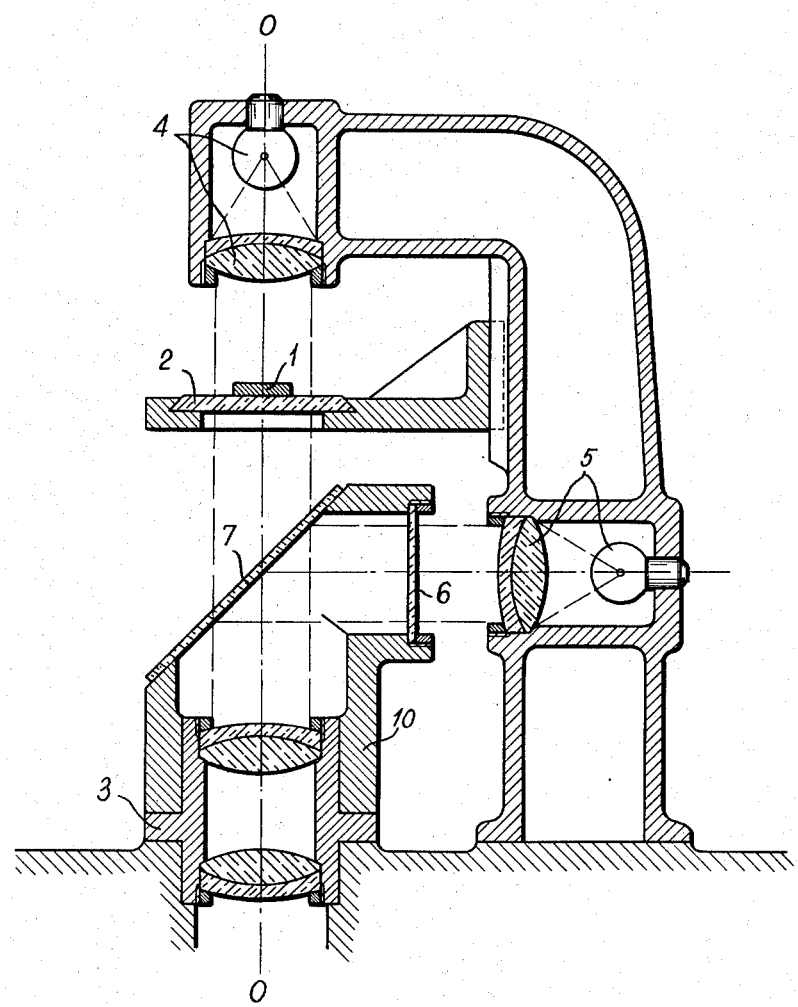
Fig. 1 is a diagrammatic cross-section of the arrangement operating through diascopic illumination.

In Figs. 1 and 2, 1 designates the workpiece to be checked, 2 the transparent object-carrying plate of a projector and 3 the objective through which the image of the workpiece and that of the reference drawing are projected with a well defined enlargement ratio onto the screen, which is not illustrated; 4 and 5 designate the conventional illuminating means for the outline projector, 4 being the diascopic illuminating means, while 5 forms the episcopic illuminating means. 6 designates a reticule carrying the reference drawing, the scale of which is 1:1 while 7 designates a semi-reflecting surface constituted by a sloping glass plate. The objective 3, the reticule 6 and the plate 7 are carried by a common support 10 adapted to revolve round the optic axis O—O of the device between the positions illustrated in Figs. 1 and 2 respectively.

In the position assumed by the revoluble support 10 in Fig. 1, the outline of the workpiece 1 illuminated by the diascopic illuminating means 4 is projected through the glass plate 7 into the objective 3 which forms the enlarged image of said outline on the screen. On the other hand, the reference drawing carried by the reticule 6 and illuminated by the episcopic illuminating means 5, forms also its image through the objective 3 after reflection on the plate 7 and consequently, this image is obtained on the screen with the same ratio of enlargement as the image of the workpiece.

In the position assumed in Fig. 2, the support 10 is assumed to have turned by 180°. The workpiece 1 is illuminated episcopically by the light from the illuminating means 5, which is sent onto it after reflection by the plate 7. The rays of light reflected by the workpiece 1 return through the plate 7 and enter the objective 3 which forms on the screen an enlarged image of the surface of the workpiece 1. It should be remarked that said workpiece may also be illuminated diascopically by the diascopically illuminating means 4 without this acting detrimentally on the operation of the episcopically illuminating means. The reference drawing is also illuminated by the rays of the episcopically operating means 5 passing through the plate of glass 7. A plane mirror 8 is positioned in this case behind the reticule 6 in order to return the rays which have passed through the drawing back onto the plate 7 on which they are reflected again, so as to enter the objective 3 and to form on the screen an enlarged image of said drawing.

In the modification illustrated in Fig. 3, the semi-reflecting plate 7 is replaced by a set of two juxtaposed prisms 9 the common hypotenuse of which is semi-reflecting. The operation of the arrangement is the same as in the case of the semi-reflecting sheet of glass 7 of Figs. 1 and 2.

The support 10, which is adapted to revolve round the optic axis O—O may occupy, as illustrated, two diametrically opposed positions corresponding respectively to diascopic illumination of the workpiece as in the case of Fig. 1, and to episcopic illumination, as in the case of Fig. 2. The mirror 8 is removable and serves only in last mentioned case of episcopic illumination.

What I claim is:

1. An outline projector for the simultaneous projection of a piece of work and of a reference drawing at a scale 1:1 onto a screen for checking the conformity between the piece of work and said reference drawing, comprising diascopic and episcopic illuminating means producing each a beam of parallel rays, the axes of said beams crossing each other orthogonally, a carrier for the piece of work to be checked lying in the path of the diascopic beam, a second carrier adapted to move round the axis of the diascopic beam and to hold the reference drawing in a plane parallel with the axis of the diascopic beam and perpendicular to the axis of the episcopic beam and in the path of the said episcopic beam, selectively in two diametrically opposed positions to either side of the axis of the diascopic beam, a semi-transparent semi-reflecting plane surface rigid with the second carrier and extending across the axis of the second carrier and at 45° with reference to the axis of each of the two beams and an objective beyond said semi-reflecting surface adapted to project simultaneously the images of the drawing and of the outline of the piece of work onto the screen.

2. An outline projector for the simultaneous projection of a piece of work and of a reference drawing at a scale 1:1 onto a screen for checking the conformity between the piece of work and said reference drawing, comprising diascopic and episcopic illuminating means producing each a beam of parallel rays, the axes of said beams crossing each other orthogonally, a carrier for the piece of work to be checked lying in the path of the diascopic beam, a second carrier adapted to move round the axis of the diascopic beam and to hold the reference drawing in a plane parallel with the axis of the diascopic beam and perpendicular to the axis of the episcopic beam and in the path of the said episcopic beam, selectively in two diametrically opposed positions to either side of the axis of the diascopic beam, a semi-transparent semi-reflecting plane surface rigid with the second carrier and extending across the axis of the second carrier and at 45° with reference to the axis of each of the two beams, an objective beyond said semi-reflecting surface adapted to project simultaneously the images of the drawing and of the outline of the piece of work onto the screen and a reflecting mirror adapted to be removably secured to the second carrier on the outside of the drawing with reference to the axis of said carrier and in parallelism with said drawing to reflect the episcopic beam passing through the semi-reflecting surface and through the drawing when the second carrier is in its position on the remote side of the semi-reflecting surface with reference to the episcopic illuminating means.

3. An outline projector for checking pieces of work through comparison of their outline with a reference drawing at a scale 1:1, comprising two illuminating means adapted to produce two parallel beams crossing each other, an objective in the path of one of said beams, a semi-transparent semi-reflecting plane surface along a bisecting line between the axes of the two beams adapted to reflect the second beam into parallelism with the first beam towards the objective, a carrier adapted to carry the piece of work in one of the beams ahead of the semi-reflecting surface to cause the outline of said piece of work to be projected diascopically through the semi-reflecting surface into the objective, a second carrier for the drawing, rigid with the semi-reflecting surface and adapted to occupy selectively two positions diametrically opposed with reference to the axis of the beam projecting the outline of the piece of work, for one of which positions the drawing is illuminated diascopically by the other beam to have its image projected after reflection on the semi-reflecting surface into the objective and for the other of which positions the drawing illuminated episcopically through the semi-reflecting surface has its image also projected into the objective, and a screen adapted to receive in superposition the images of the piece of work and of the drawing formed by the objective.

4. An outline projector for checking pieces of work through comparison of their outline with a reference drawing at a scale 1:1, comprising two illuminating means adapted to produce two parallel beams crossing each other, an objective in the path of one of said beams, a semi-transparent semi-reflecting plane surface along a bisecting line between the axes of the two beams adapted to reflect the second beam into parallelism with the first beam towards the objective, a carrier adapted to carry the piece of work in one of the beams ahead of the semi-reflecting surface to cause the outline of said piece of work to be projected diascopically through the semi-reflecting surface into the objective, a second carrier for the drawing, rigid with the semi-reflecting surface and adapted to occupy selectively two positions diametrically opposed with reference to the axis of the beam projecting the outline of the piece of work, for one of which positions the drawing is illuminated diascopically by the other beam to have its image projected after reflection on the semi-reflecting surface into the objective and for the other of which positions the drawing illuminated episcopically through the semi-reflecting surface has its image also projected into the objective, a reflecting surface adapted to be removably fitted in the second carrier to the rear of the drawing for the second position of said carrier to reflect the light passing through the drawing back onto the semi-reflecting surface and into the objective, and a screen adapted to receive in superposition the images of the piece of work and of the drawing formed by the objective.

5. An outline projector for the simultaneous projection of a piece of work and of a drawing for checking the conformity between the piece of work and the drawing, comprising diascopic and episcopic illuminating means adapted to produce each a beam of parallel rays, the axes of said beams crossing each other orthogonally, an objective in the path of the diascopic beam, a semi-transparent semi-reflecting plane surface crossing the axes of the two beams substantially at the point of intersection between their axes and at 45° with reference thereto, a carrier adapted to hold the piece of work to be checked in the path of the diascopic beam on the side of the semi-reflecting surface opposed to the objective, a second carrier carrying the semi-reflecting surface and the drawing in planes perpendicular to the plane of the axes of the beams, the plane of the drawing being parallel to the axis of the diascopic beam, said second carrier being adapted to occupy selectively two diametrically opposed positions with reference to the axis of the diascopic beam to provide each time a diascopic projection of the drawing through the semi-reflecting surface into the objective, a reflecting surface adapted to be fitted to the rear of the drawing on last-mentioned carrier in its second position to reflect the episcopic beam passing through the drawing back through same onto the reflecting surfacve and into the objective, the piece of work on the first carrier being illuminated by the episcopic beam reflected by the reflecting surface for the second position of the second carrier, and a screen adapted to receive the images of the piece of work and of the drawing formed by the beams passing through the semi-reflecting surface and through the objective for either of the two positions of the second carrier.

6. An outline projector for the simultaneous projection of a piece of work and of a reference drawing at a scale 1:1 onto a screen for checking the conformity between the piece of work and said reference drawing, comprising diascopic and episcopic illuminating means producing each a beam of parallel rays, the axes of said beams crossing each other orthogonally, a carrier for the piece of work to be checked lying in the path of the diascopic beam, a second carrier adapted to move round the axis of the diascopic beam and to hold the reference drawing in a plane parallel with the axis of the diascopic beam and perpendicular to the axis of the episcopic beam and in the path of said episcopic beam, selectively in two diametrically opposed positions to either side of the axis of the diascopic beam, a semi-transparent semi-reflecting plane surface rigid with the second carrier and extending across the axis of the second carrier and at 45° with reference to the axis of each of the two beams and adapted to transmit directly the diascopic beam after passage over the piece of work and to reflect into the direction of the diascopic beam the episcopic beam after passage through the drawing and an objective in the path of the diascopic beam and reflected episcopic beam, adapted to project the images of the outline of the piece of work and of the drawing conveyed by the beams onto the screen.

7. An outline projector for checking pieces of work by projecting images thereof onto a common surface, comprising means for producing two orthogonal beams of parallel rays, a reference drawing of the piece of work to the scale 1:1, an objective in the path of the first beam, a semi-transparent semi-reflecting surface extending through the two beams at 45° with reference to the axes of the two said beams to the front of the objective, a support rigid with said surface, revolubly mounted around the axis of the objective and adapted to carry the drawing across the path of the second beam selectively in two positions respectively to the front and to the rear of the semi-reflecting surface, a screen in the path of the first beam beyond the objective, a support for the piece of work adapted to carry the latter ahead of the first support in the path of the first beam and of the second beam when reflected by the semi-reflecting surface away from the objective, the semi-reflecting surface being adapted for both positions of the revoluble support to transmit directly the first beam into the objective after passage through the piece of work and to reflect for both positions of the revoluble support and second beam after passage over the drawing to form on the screen beyond the objective superposed images of the piece of work and of the drawing, said semi-reflecting surface being also adapted for the second position of the first support to reflect a fraction of the episcopic beam onto the piece of work, said fraction being returned by the piece of work through the semi-reflecting surface into the objective to form an image of said piece of work on the screen.

8. An outline projector for checking pieces of work by projecting images thereof onto a common surface, comprising means for producing two orthogonal beams of parallel rays, a reference drawing of the piece of work to the scale 1:1, an objective in the path of the first beam, a semi-transparent semi-reflecting surface extending through the two beams at 45° with reference to the axes of the two said beams to the front of the objective, a support rigid with said surface, revolubly mounted round the axis of the objective and adapted to carry the drawing across the path of the second beam selectively in two positions respectively to the front and to the rear of the semi-reflecting surface, a screen in the path of the first beam beyond the objective, a support for the piece of work adapted to carry the latter ahead of the first support in the path of the first beam and of the second beam when reflected by the semi-reflecting surface away from the objective, the semi-reflecting surface being adapted for both positions of the revoluble support to transmit directly the first beam into the objective after passage through the piece of work and to reflect for both positions of the revoluble support the second beam after passage through the drawing to form on the screen beyond the objective superposed images of the piece of work and of the drawing, said semi-reflecting surface being also adapted for the second position of the first support to reflect a fraction of the episcopic beam onto the piece of work, said fraction being returned by the piece of work through the semi-reflecting surface into the objective to form an image of said piece of work on the screen, a mirror adapted to be removably secured to the revoluble support behind the location of the drawing to reflect a fraction of the second beam passing through the semi-reflecting surface and through the drawing in the second position of the revoluble support and back onto the semi-reflecting surface to enhance the image of the drawing formed on the screen in superposed relationship with the image of the piece of work.

9. An outline projector adapted to form on a screen images of a piece of work to be checked and of a reference drawing thereof at the scale 1:1, the said projector comprising diascopic illuminating means, an objective aligned therewith, a light-permeable carrier for the piece of work to be checked, fitted between the diascopic illuminating means and the objective, episcopic illuminating means the axis of which crosses orthogonally the axis of the diascopically illuminating means, and extending in a plane passing between the objective and the carrier, a revoluble support coaxial with the objective, means for securing the reference drawing to the said revoluble support in a plane perpendicular to the plane of symmetry of the latter passing through the axis of the support, a semi-reflecting semi-transparent surface adapted to revolve in unison with the said support and to assume with the latter selectively two positions for which the perpendicular to the said surface is parallel respectively with one of the two bisecting lines of the angles formed by the axes of the two illuminating means and means removably secured to the revoluble support to the back of the location of the drawing and adapted to reflect, for the position of the support for which the drawing is located on the side of the semi-reflecting surface opposed to the episcopic illuminating means, the beam from said episcopic illuminating means through the drawing back to the semi-reflecting surface, into the objective and onto the screen.

References Cited in the file of this patent

UNITED STATES PATENTS

| 2,155,248 | Adams | Apr. 18, 1939 |
| 2,261,772 | Longfellow | Nov. 4, 1941 |

FOREIGN PATENTS

| 309,137 | Great Britain | Mar. 13, 1930 |